US008751530B1

(12) United States Patent
Ioffe

(10) Patent No.: US 8,751,530 B1
(45) Date of Patent: Jun. 10, 2014

(54) VISUAL RESTRICTIONS FOR IMAGE SEARCHES

(75) Inventor: Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/565,149

(22) Filed: Aug. 2, 2012

(51) Int. Cl.
*G06F 17/30* (2006.01)

(52) U.S. Cl.
CPC .................. *G06F 17/30247* (2013.01)
USPC ......................................... 707/772

(58) Field of Classification Search
USPC ......................................... 707/772
See application file for complete search history.

(56) References Cited

U.S. PATENT DOCUMENTS

| 5,915,250 A * | 6/1999 | Jain et al. ........................ 1/1 |
| 2011/0238659 A1* | 9/2011 | Chittar et al. ................ 707/724 |

OTHER PUBLICATIONS

David Grangier, Florent Monay, and Samy Bengio, Learning to Retrieve Images From Text Queries With a Discriminative Model, 15 pages.

* cited by examiner

*Primary Examiner* — Robert Beausoliel, Jr.
*Assistant Examiner* — Nirav K Khakhar
(74) *Attorney, Agent, or Firm* — Fish & Richardson P.C.

(57) ABSTRACT

A method and apparatus are provided for performing an image search based on a search query having a portion $P_1$ and a portion $P_2$. Based on the first search query, a second search query is generated that includes a portion $P_3$ and the portion $P_2$, such that the second search query is broader in scope than the first search query, while still retaining the portion $P_2$ of the first query. A first image search is then performed for the first search query to obtain a first set of search results and a second image search is performed for the second search query to obtain a second set of search results. Consequently, an image from the first set of search results is selected for presentation to a user, wherein the selection is based on content of the second set of search results.

20 Claims, 11 Drawing Sheets

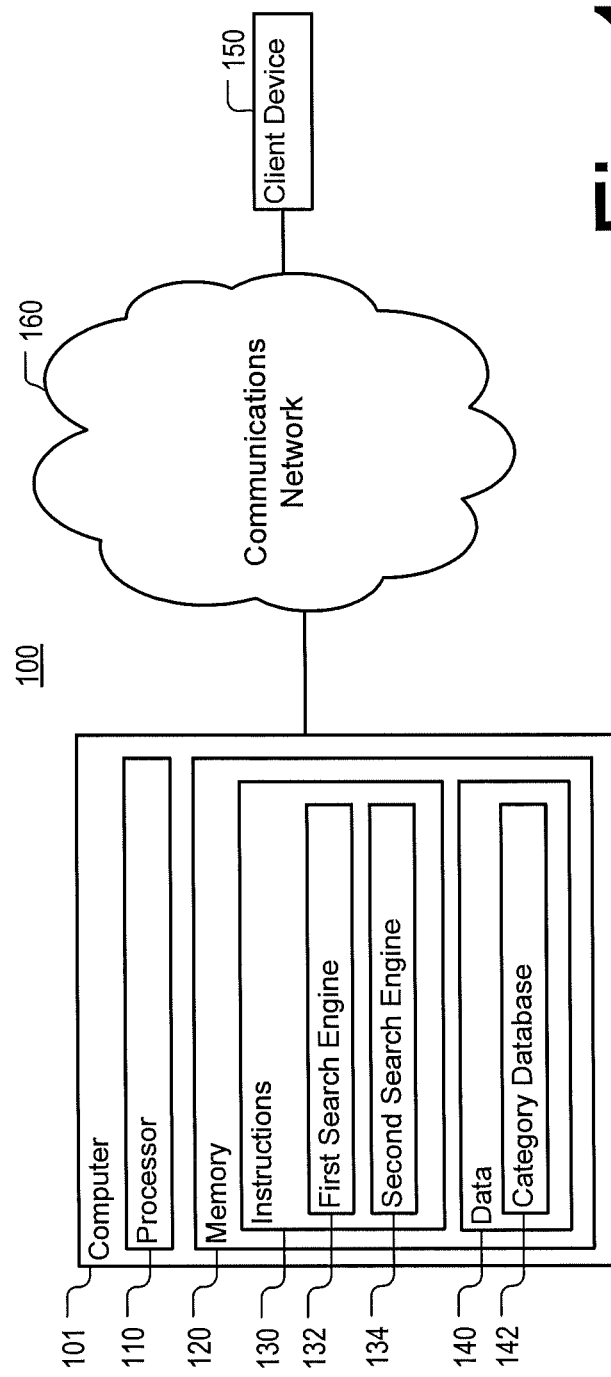

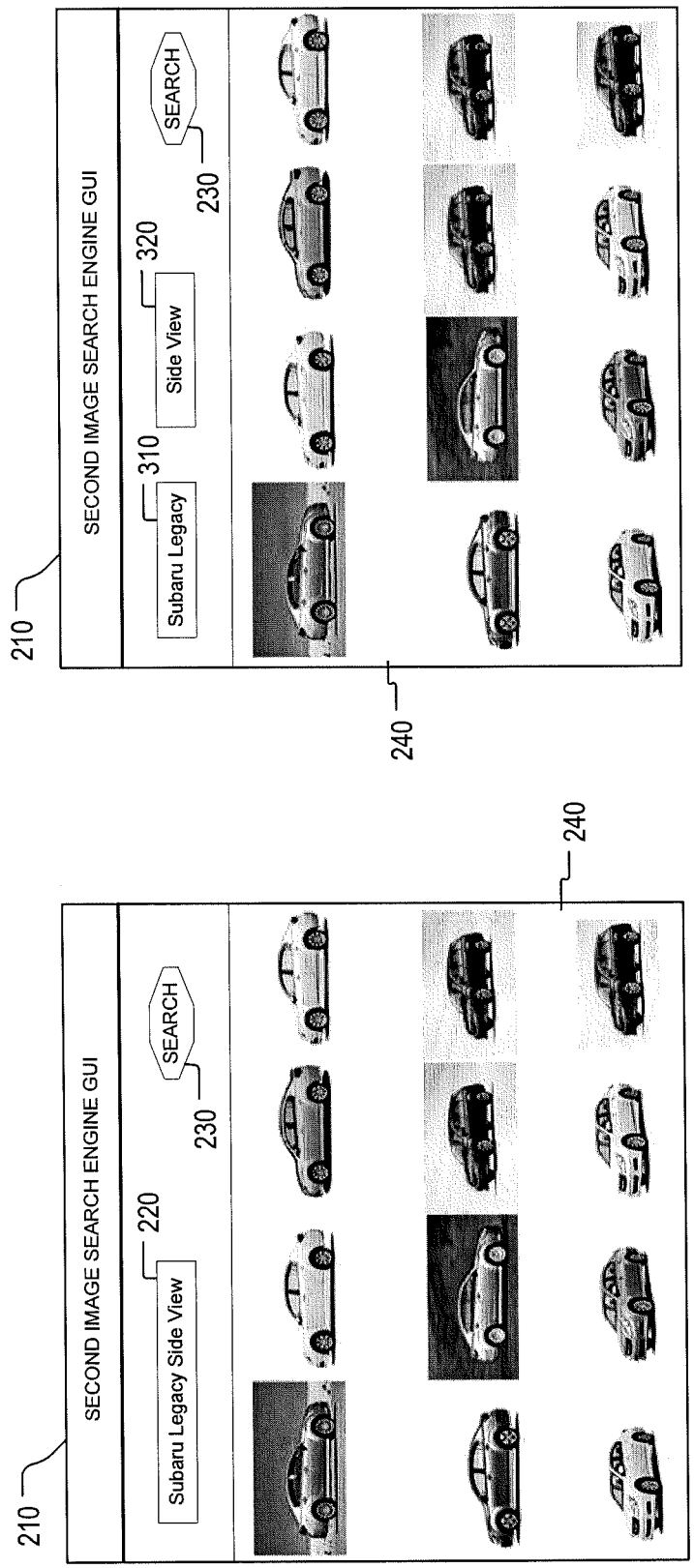

VISUAL RESTRICTIONS FOR IMAGE SEARCHES

BACKGROUND

Image search engines provide an easy and efficient way of searching large collections of images. In operation, image search engines may receive text search queries as user input and retrieve images that match the text queries in response. The text queries may include one or more keywords that identify an object that is sought to be depicted in images retrieved by the search engines. Thus, for example, when a search engine is provided with a query "Eiffel Tower", the image search engine may desirably retrieve images of the Eiffel Tower.

SUMMARY

In one aspect, a method and apparatus are provided for performing an image search based on a first search query that includes portions $P_1$ and $P_2$. Based on the first search query, a second search query is generated that includes a portion $P_3$ and the portion $P_2$, such that the second search query is broader in scope than the first search query while still retaining the portion $P_2$ of the first query. A first image search is then performed for the first search query to retrieve a first set of search results and a second image search is performed for the second search query to retrieve a second set of search results. Afterwards, an image from the first set is selected for presentation to a user, wherein the selection is based on content of the second set of search results.

In another aspect a computer-implemented method for performing a search for images that depict an object is provided. The method includes determining a category that an object identified in a search query is associated with and generating a second search query that includes an indication of the category and an indication of a viewpoint of the object. The view point is also indicated in the first search query. The method further includes obtaining a first image that is responsive to the first search query and a plurality of images responsive to the second search query. The method further includes determining, by a processor, a measure of similarity between the first image and one or more images from the plurality of images and providing, by the processor, the first image for presentation to a user in response to the measure of similarity meeting a threshold.

The computer-implemented method may further include generating a first representation based on the first image, generating a second representation based on one or more of the images from the plurality of images, and determining a difference between the first representation and the second representation. The measure of similarity may further be based on the identified difference. The category may further be determined by accessing a database that relates keywords to categories the keywords are associated with. The second search query may further encompass the first search query, such that images that are responsive to the first search query are necessarily responsive to the second search query. The viewpoint of the object may further be one of an orthographic projection viewpoint and a perspective projection viewpoint.

The measure of similarity may further be determined by evaluating a function $F(q,p)$ that is learned based on at least one of the plurality of images. The function $F(q,p)$ may further be evaluated with the parameter q being based on the first query, and with a parameter p being based on the first image. The measure of similarity may thus be based on a value of the function $F(q,p)$. Alternatively, determining the measure of similarity may further include training an image classifier using one or more images from the plurality, calculating a score indicating the relevance of the first image to the first search query by using the trained image classifier. The measure of similarity may further be based on the calculated score.

In another aspect, an apparatus for performing image searches is provided. The apparatus includes a processor. The processor is configured to determine a category that an object identified in a search query is associated with and generate a second search query that includes an indication of the category and an indication of the viewpoint. The view point is also indicated in the first search query. The processor is further configured to obtain a first image that is responsive to the first search query and a plurality of images responsive to the second search query. The processor is further configured to determine a measure of similarity between the first image and one or more images from the plurality of images, and provide the first image for presentation to a user in response to the measure of similarity meeting a threshold.

The processor may further be configured to generate a first representation based on the first image, generate a second representation based on one or more of the images from the plurality of images, and determine a difference between the first representation and the second representation. The measure of similarity may further be based on the identified difference. The category may further be determined by accessing a database that relates keywords to categories the keywords are associated with. The second search query may further encompass the first search query, such that images that are responsive to the first search query are necessarily responsive to the second search query. The viewpoint of the object may further be one of an orthographic projection viewpoint and a perspective projection viewpoint.

The measure of similarity may further be determined by evaluating a function $F(q,p)$ that is learned based on at least one of the plurality of images. The function $F(q,p)$ may further be evaluated with the parameter q being based on the first query and the parameter p being based on the first image. The measure of similarity may thus be based on a value of the function $F(q,p)$. Alternatively, determining the measure of similarity may further include training an image classifier using one or more images from the plurality, calculating a score indicating the relevance of the first image to the first search query by using the trained image classifier. The measure of similarity is based on the calculated score.

In yet another aspect, a non-transitory computer readable storage medium comprising instructions that, when executed by a processor, cause the processor to perform a method for searching for images. The method includes determining a category that a object identified in a search query is associated with and generating a second search query that includes an indication of the category and an indication of a viewpoint of the object. The view point is also indicated in the first search query. The method further includes obtaining a first image that is responsive to the first search query and a plurality of images responsive to the second search query. The method further includes determining, by the processor, a measure of similarity between the first image and one or more images from the plurality of images and providing, by the processor, the first image for presentation to a user in response to the measure of similarity meeting a threshold.

The method may further include generating a first representation based on the first image, generating a second representation based on one or more of the images from the plurality of images, and determining a difference between the first representation and the second representation. The measure of similarity may further be based on the identified difference. The category may further be determined by accessing a database that relates keywords to categories the keywords are associated with. The second search query may further encompass the first search query, such that images that are responsive to the first search query are necessarily responsive to the second search query. The viewpoint of the object may further be one of an orthographic projection viewpoint and a perspective projection viewpoint.

The measure of similarity may further be determined by evaluating a function $F(q,p)$ that is learned based on at least one of the plurality of images. The function $F(q,p)$ may further be evaluated with the parameter q being based on the first query and the parameter p being based on the first image. The measure of similarity may be based on a value of the function $F(q,p)$. Alternatively, determining the measure of similarity may further include training an image classifier using one or more images from the plurality, calculating a score indicating the relevance of the first image to the first search query by using the trained image classifier. The measure of similarity may thus be based on the calculated score.

In yet another aspect, a computer-implemented method for performing an image search is provided. The method includes receiving a first search query that includes a first keyword and a second keyword, identifying a category the first keyword is associated with, and generating a second search query. The generated second search query includes an indication of the category and the second keyword. The method further includes performing a first image search for the first search query, to retrieve a first set of images that are found to match the first search query and performing a second image search for the second search query to retrieve a second set of images that are found to match the second search query. The method further includes training, by a processor, an image classifier using one or more images from the second set and assigning, by the processor, a score to a first image from the first set by using the trained image classifier. The score is an estimate of a relevance of the first image to the first search query. The score is produced by the trained image classifier. The method further includes outputting the first image for presentation to a user based on the assigned score.

The image from the first set may further be output only when the score meets a predetermined threshold. The image classifier may further implement a function $F(q,p)$, wherein q is a representation of a search query, p is a representation of an image, and the assigned score is based on a value of the function $F(q,p)$. The first keyword may further identify an object, and the second keyword may further view point of the object. Outputting the first image may further include transmitting the first image to a client device. The viewpoint of the object may further be one of an orthographic projection viewpoint and a perspective projection viewpoint.

In yet another aspect, an apparatus is provided that includes a processor coupled to a memory. The memory is configured to store a database that relates keywords to associated categories. The processor is configured to receive a first search query that includes a portion $P_1$ and a portion $P_2$ that is different from $P_1$. The portion $P_1$ identifies an object that is sought to be depicted in images returned as a result of the image search. The processor is further configured to identify, based on the portion $P_1$, a search query portion $P_3$ that is broader in scope than the portion $P_1$ and generate a second search query that includes the portion $P_3$ and a portion $P_4$. The processor is further configured to perform a first image search for the first search query and retrieve at least a first set of images that are found to match the first search query. The processor is further configured to perform a second image search for the second search query to retrieve a second set of images that are found to match the second search query. The processor is further configured to determine whether to output a first image from the first set based on one or more images from the second set, and output the first image for presentation to a user when it is determined that the image should be output.

The processor may further be configured to train an image classifier using images from the second set, and calculate a score indicating the relevance of the first image to the first search query by using the trained image classifier. The determination of whether to output the first image is based on the calculated score. The image classifier may further implement a function $F(q,p)$, wherein q is a representation of a search query, p is a representation of an image, and the calculated score is based on a value of the function $F(q,p)$.

The processor may further be configured to determine a measure of similarity between the first image and one or more images from the second set. The determination of whether to output the first image is based on the measure of similarity. The processor may be further configured to generate a first representation of the first image, generate a second representation of the one or more images from the second set, and identify a difference between the first representation and the second representation. The determination of whether to output the first image is based on the identified difference. Outputting the first image may further include presenting the first image for display on a display device or transmitting the first image over a communications network to a client device.

The portion $P_1$ may further include at least one keyword and the portion $P_2$ also includes at least one keyword. The portion $P_4$ may further be identical to the portion $P_2$. The portion $P_4$ may further have substantially the same scope as the portion $P_2$. The portion $P_3$ may further be a category. The portion $P_3$ may further be a search query that exhibits a predetermined statistical relationship with the portion $P_1$ within the sample space of a query refinement log. The query refinement log may further include a plurality of search query sets.

BRIEF DESCRIPTION OF THE DRAWINGS

FIG. 1 depicts a schematic diagram of a system for performing image searches in accordance with aspects of the disclosure.

FIG. 2 depicts a schematic diagram of a graphical user interface (GUI) of a second image search engine in accordance with aspects of the disclosure.

FIG. 3 depicts a schematic diagram of the GUI of the second image search engine in accordance with aspects of the disclosure.

DETAILED DESCRIPTION

Figure 4:
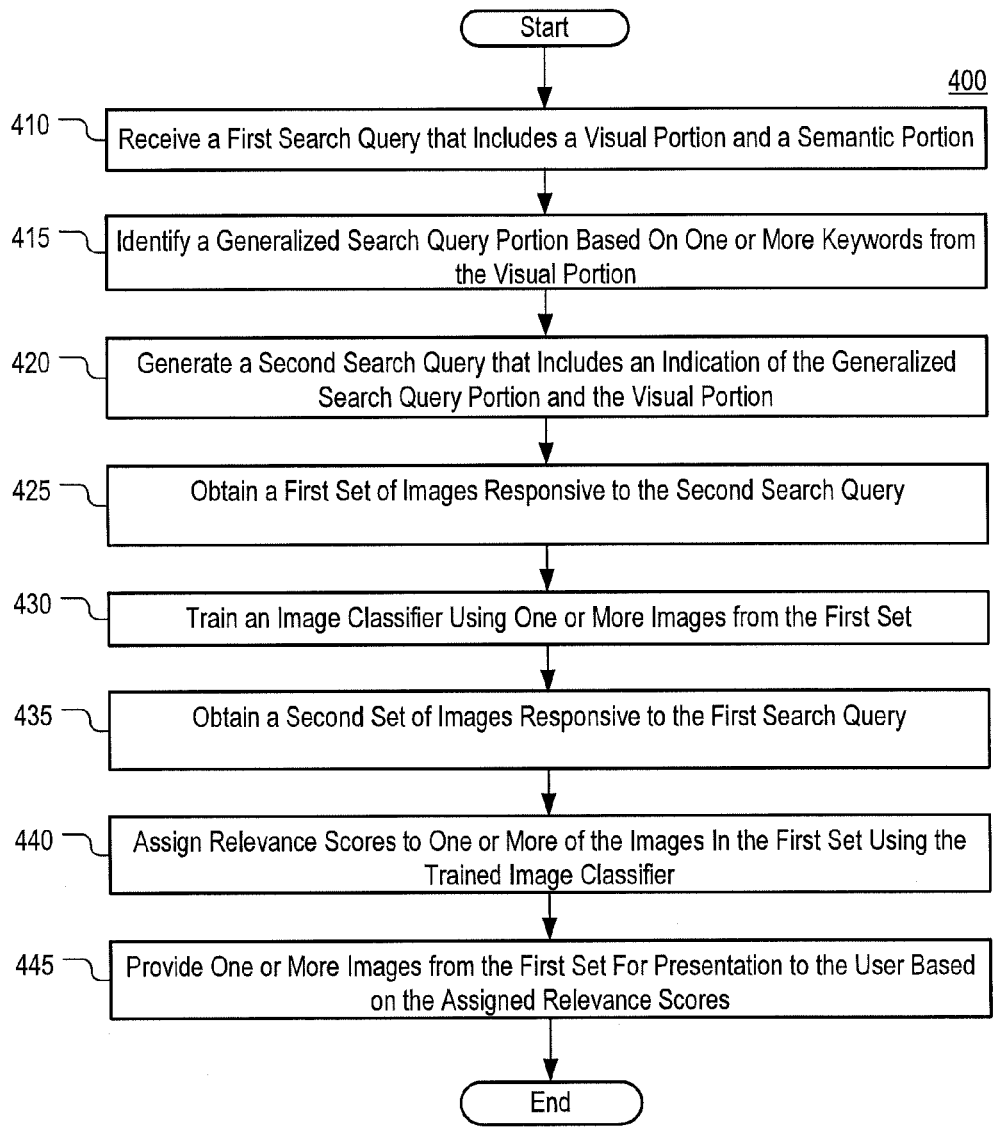
FIG. 4 depicts a flowchart of a process in accordance with aspects of the disclosure.

As shown in FIG. 1, an example system 100 may include a computing device 101, a client device 150, and a communications network 160. Computing device 101 may contain a processor 110, memory 120 and other components typically present in general purpose computers. The computing device 101 may be a personal computer, server, mainframe, laptop, desktop, cell phone, or any other processor-based device. Memory 120 stores information accessible by processor 110, including instructions 130 that may be executed by the processor 110. The memory also includes data 140 that may be retrieved, manipulated or stored by the processor. The memory may be of any type capable of storing information accessible by the processor, such as a hard-drive, memory card, ROM, RAM, DVD, CD-ROM, write-capable, and read-only memories.

The processor 110 may be any well-known processor, such as commercially available CPUs. Alternatively, the processor may be a dedicated controller such as an ASIC. The instructions 130 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

First image search engine 132 may be a custom or commercially available image search engine, such as the image search engines provided by commercially available web sites. In operation, the search engine 132 receives a text search query as user input. The first search engine 132 then examines a collection of images to identify images that match the search query. In identifying the images, the first image search engine assigns a relevance score to each of the images. The relevance score of an image may be an estimate of how well the image matches the query and it may be a number or alphanumerical string or any other type of identifier. Once the relevance scores are assigned, the search engine returns images having the highest relevance scores as the result of the search query.

The second image search engine 134 may include software executed by the processor 110 for processing search queries and retrieving images in response to the search queries. In some aspects, the second image search engine 134 may use an image classifier that is trained based search results produced by the first search engine 132. In other aspects, the second search engine 134 may use computer vision techniques to compare images from different sets of search results that are produced by the first search engine 132. In yet another aspect, the second search engine 134 may use any function that maps one or more image(s) from one set of search results produced by the first search engine 132 to a ranking score. The function may be learned based on one or more images from another set of search results returned by the first search engine 132. Examples of techniques that could be implemented by the second image search engine 134 are discussed in further with respect to FIGS. 4-7 and 11-13.

In operation, the second search engine may receive a search query specifying one or more criteria for the selection of images, such as criteria specifying what objects are to be depicted in the image, viewpoint of the object (e.g., side view, isometric view, perspective view), and others. The first search engine 134 may then process the received search query and retrieve images matching the criteria. For example, a search query "Subaru Legacy" may cause the second image search engine 134 to retrieve photographs of a Subaru Legacy. Although the image search engine 134 is depicted as being a separate software application from the first image search engine 132, in other examples the first search engine 132 and the second image search engine 134 may be integrated together in a single application. Alternatively, in instances where the first search engine 132 is executed on a remote server, the first search engine 132 and the second search engine 134 may be connected to each other over a communications network, such as the Internet.

In one aspect, the second search engine 134 may be capable of receiving a search query that includes both a semantic portion and a visual portion. The semantic portion may include one or more keywords that identify an object that is sought to be depicted in images returned in response to the search query. The keywords may be brand names, model numbers, style names, or any other type of string that identifies a physical object that is capable of being depicted in a photograph or drawing. For example, the semantic portion of a search query may include the keyword(s) "Cape Cod style" when a search for pictures of houses is performed or "Trinitron" when a search for photographs of television sets is undertaken.

The visual portion may include one or more keywords that specify an image characteristic that is neutral with respect to the identity of any of the objects sought to be depicted in images returned in response to the search query. In one aspect, the visual portion may include one or more indications of a viewpoint of the object. The indication of the viewpoint of the object may include any other keyword or number specifying a perspective, or projection in which an object is to be depicted in an image that is returned as a result of the search. For example, the indication of object viewpoint may include keywords such as "side view", "top view", "front view", or "bottom view." As another example, the indication of object viewpoint may identify a camera point with respect to an object depicted in an image. The camera viewpoint may identify a position or angle of a camera relative to the object depicted in the image.

In another aspect, the visual portion of the first search query may pertain to the time of day when images are taken. For example, it may specify that the object be depicted in a night setting (e.g., a Subaru Legacy at night). Thus in the above examples, the keywords that make up the visual portion may relate to the context in which an object is photographed (e.g., location of camera taking the image or time of day).

In yet another aspect, the visual portions of search queries may be neutral with respect to objects that are depicted in images returned as a result of the search queries. For example, the criterion for the selection of images set by the search query portion "side view" may be satisfied by both photographs depicting a side view of a vehicle and a side view of a stapler. Thus, the search query portion "side view" may be regarded as being neutral with respect to the identity of any of the objects depicted in the images.

Regarding search queries having a visual portion, in one example, the second search engine 134 may receive a first search query $Q_1$ that includes portions $P_v$ and $P_s$, such that $P_s$ is a semantic portion and $P_v$ is a visual portion. Then, the second search engine 134 may generate a second search query $Q_2$ having a portion $P_C$ and the portion $P_s$, wherein the portion Pc includes an indication of a category which a keyword in the portion $P_s$ is associated with. Afterwards, the second search engine 134 may perform a first search for the query $Q_1$ and a second search for the query $Q_2$ and retrieve a first set of image results in response to the first search query and a second set of image results in response to the second query. Afterwards the second search engine may present images from the first set to a user based on the content of the second set.

In another aspect, the second search engine is capable of receiving a search query that includes a first portion and a second portion, wherein both the first portion and the second portion identify different objects. An example of one such search query may be "John Smith wearing a leather jacket". In this example, the portion "wearing a leather jacket" may be neutral with respect to the portion "John Smith" because the criterion "wearing leather jacket" can be satisfied by the image of any person wearing a leather jacket and not just John Smith. Thus, the criterion specified by the second portion may be possessed by both images that meet the criterion set by the first portion and images that fail to meet the same criterion. The first portion in this example may be considered to be independent of the second portion. However, it should be noted that the portion "wearing leather jacket" is not neutral with respect to the content of images returned a result of the search query because it specifies an additional object— leather jacket—that is required to be present in the search query search results.

Regarding search queries that have independent portions, in one example, the second search engine may receive a first search query $Q_1$ that includes portions $P_1$ and $P_2$, such that portions $P_1$ and $P_2$ are independent from each other. Then, the second search engine 134 may generate a second search query having a portion $P_3$ and the portion $P_2$, wherein the portion $P_3$ includes an indication of a category which a keyword in the portion $P_1$ is associated with. Afterwards, the second search engine 134 may perform a first search for the query $Q_1$ and a second search for the query $Q_2$ and retrieve a first set of image results in response to the query $Q_1$ and a second set of image results in response to the query $Q_2$. Afterwards the second search engine may present images from the first set to a user based, wherein the images from the first set are presented based on the content of the second set.

Data 140 may be retrieved, stored or modified by processor 110 in accordance with the instructions 130. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Category database 142 may be a database relating keywords (or combinations of keywords) to categories associated with the keywords. The keywords may be any type of keyword capable of being submitted as part of an image search query. In one aspect, the database 142 may relate keywords to the names of categories the keywords are associated with. The keyword-category relationships may be specified manually by system administrators or alternatively, they may be determined using word clustering algorithms. In the latter instances, the "categories" may be identifiers used to identify clusters of keywords. Regardless of how it is populated, the database 142 may be stored in either binary or text format in the memory 140. The database may be stored as a standalone file, database record, or any other type of data structure. In some aspects, the database 142 may include content as illustrated in Table 1 below:

TABLE 1

| Category Database | |
| --- | --- |
| Keyword | Associated Category |
| Toyota Celica | Car |
| Honda Civic | Car |
| Fiat 500 | Car |
| Ford F150 | Truck |
| Dodge Ram | Truck |
| Cape-cod style house | House |
| Ranch style house | House |

The client device 150 may be a personal computer, laptop, netbook, smart phone, or any other processor-based device capable of submitting image search queries to the computing device 101. The client device 150 may be a connected to the computing device 101 via a communications network 160. The communications network 160 may include a TCP/IP, LAN, WiFi, Ethernet, InfiniBand, or any other type of communications network capable of transporting data between the computing device 101 and the client device 150. In this example, the network 160 is the Internet.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

FIG. 2 depicts a schematic diagram of a GUI 210 of the second image search engine 134 in accordance with one example. In this example, the GUI 210 may include a text input field 220, a search button 230, and a graphics pane 240. In operation, the GUI 210 may receive a search query "Subaru Legacy side view" as input via the text input field 220. Afterwards, when the button 230 is pressed, the input search query may be submitted to the second search engine 134. The GUI 210 may then receive a set of images that are found by the second search engine 134 to match the search query. The received images may be displayed in the graphics pane 240.

FIG. 3 depicts a schematic diagram of the GUI 210 in accordance with another example. In this example, the GUI 210 may include text input fields 310-320, the search button 230, and the graphics pane 240. In operation, the GUI 210 may receive the search query "Subaru Legacy side view" via the text fields 310-320. Each one of the text fields 310-320 may be used to specify a different portion of the search query (e.g., a visual portion or a semantic portion). For instance, the text field 320, as illustrated, may be used for specifying object viewpoint. When the search button 230 is pressed, the portions of the search query specified in the text fields 310-320 may be submitted to the second search engine 134. The GUI 210 may then receive a set of images that are found by the second search engine 134 to match the search query. The received images may be displayed in the graphics pane 240. Although in the above examples, text fields are used to specify the search query, in other examples different GUI components, such as dropdown menus or checkboxes, may be used to specify at least a portion of the search query (e.g., a semantic portion or a visual portion).

FIG. 4 depicts a flowchart of a process 400 for performing an improved image search in accordance with aspects of the disclosure. At task 410, a first search query is received having a semantic portion and a visual portion. In this example, the first search query may be "Subaru Legacy side view." "Subaru Legacy" may be the semantic portion of the search query and "side view" may be the visual portion. At task 415, a generalized search query portion is determined. Specifically, one or more keywords are obtained from the semantic portion of the first query and a generalized version of the semantic portion of the first search query is determined based on the obtained keywords. In one aspect, the generalized version of the semantic portion may be a category associated with the obtained keywords. The category may be determined in accordance with a taxonomy specified in a database, such as the database 142 that relates keywords to categories associated with the keywords. In another aspect, as is discussed with respect to FIG. 5, the generalized search query portion may be another search query that bears a predetermined statistical relationship to the semantic portion of the search query (e.g., "Subaru Legacy") within the sample space of a query refinement log. In this example, the generalized version is a category determined by consulting the database 142. Specifically, the keywords "Subaru Legacy" may be extracted from the first search query and the category "car" may be identified by cross-referencing the keywords "Subaru Legacy" with a category name in the database 142. Task 415 is further discussed with respect to FIG. 5.

At task 420, a second search query is prepared that includes both an indication of the generalized search query portion and the visual portion of the first search query. In this example, the second search query is "car side view." Notably, the second search query is broader that the first search query, even though both search queries include the same visual portion (side view). The second query can be satisfied by images of any car, whereas the first search query requires matching images to depict a Subaru Legacy.

Figure 8:
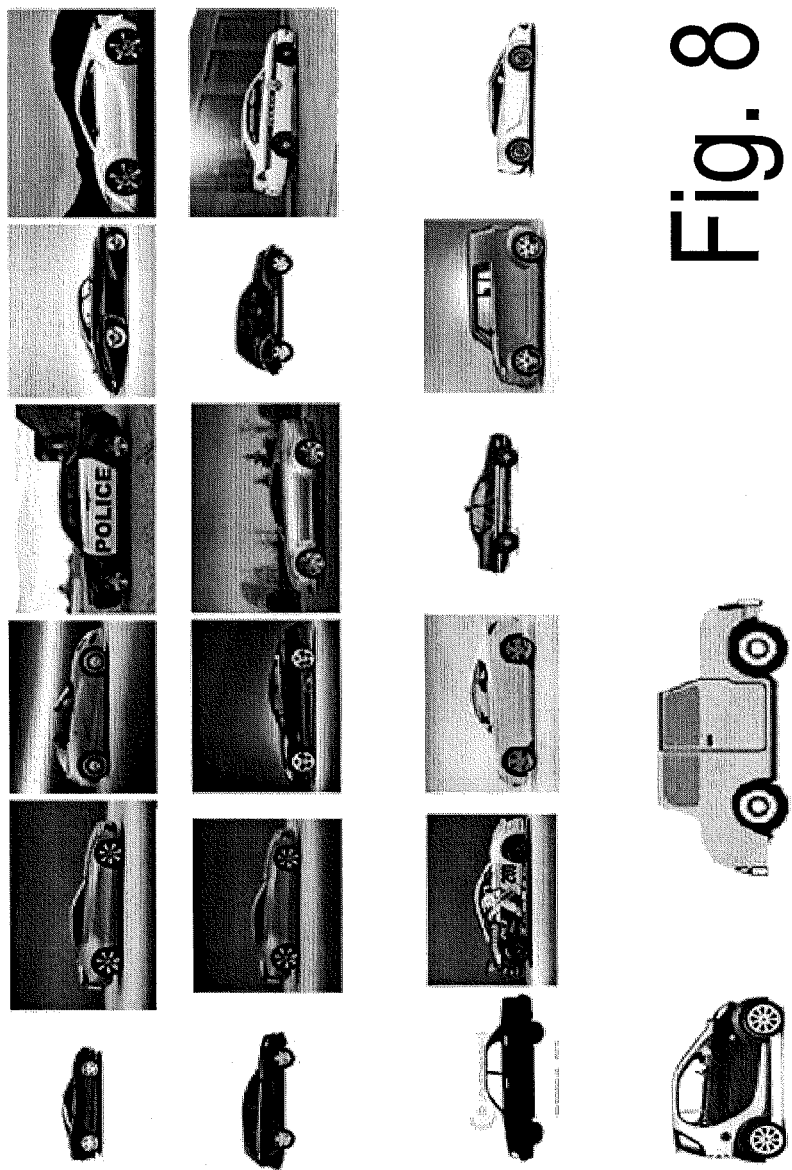
FIG. 8 depicts a first set of images returned by a first search engine in response to a first search query.

At task 425 an image search is performed using the second search query (e.g., car side view) and a first set of images is obtained responsive to the search. The search query may be performed using any known image search engine, such as the first image search engine 132. The first set may include images that are found by the search engine to match the second search query. In this example, the search results may be the images in the set 800 depicted in FIG. 8.

At task 430 an image classifier is trained using images from the first set. The image classifier may be a tool (e.g., software tool or electronic circuit) for determining whether images in a collection are relevant with respect to a text search query that is provided to the image classifier as user input. In some aspects, for each image that is processed using the classifier, a relevance score may be generated by the classifier as an estimate of the images' relevance with respect to a specified search query. Specifically, the image classifier may implement a function F(q, p), wherein q, is a text query, p is an image whose relevance to the query q is evaluated, and the value of the function F may be the basis for a relevance score. Training the image classifier based on the images from the first set may thus involve determining a function F, such that $F(q,p^+)>F(q,p^-)$, wherein $p^+$ is an image relevant to the query q and $p^-$ is an image that is not relevant to the query q. The function F may be determined based on images returned as a result of the image search for the second search query. The training is further discussed with respect to FIG. 6. Accordingly, in one aspect, the image classifier may be any tool that implements a function F for calculating relevance score for an image with respect to a search query based on a representation (e.g., numerical representation) of the search query.

At task 435, an image search is performed using the first search query (e.g., Subaru Legacy side view) and a second set of images is obtained responsive to the search. The search query may be performed using any known image search engine, such as the first image search engine 132. The second set of images may include images that are found by the search engine to match the first search query. In this example, an image set 900 depicted in FIG. 9 may be returned as a result of the search for the first query.

Figure 9:
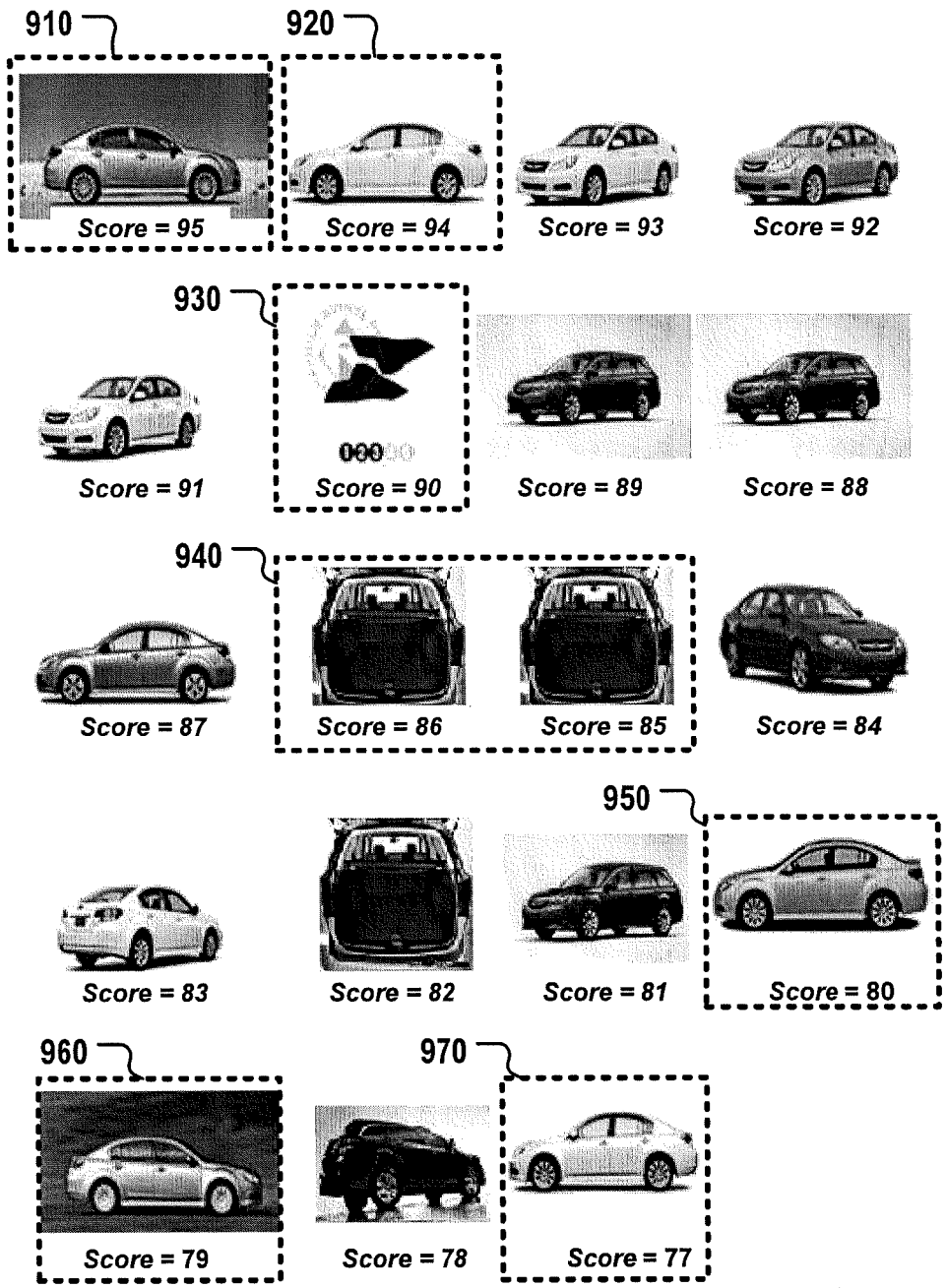
FIG. 9 depicts a second set of images retuned by the search engine of a first search engine in response to a second search query.

As illustrated in FIG. 9, images 910 and 920 may be given the highest relevance scores, images 950-970 may be given the lowest relevance scores, and the images 930 and 940 may be given relevance scores that are in the middle. Assigning relevance scores to the images 930-940 that are higher than the relevance scores of images 950-970 may be in error as the images 930-940 do not depict side views of a Subaru Legacy as requested by the first search query. By contrast, the images 950-970 depict the requested side views, but they are paradoxically given lower scores than images that do not. Thus, in this example, the images 930-940 are erroneously considered by the search engine that performed the search for the first query, to be more relevant with respect to the first query than the images 950-970. In some aspects, the scores may not be explicitly provided by the search engine performing the search for the first query, rather they may be implied in the way images in the second set are ordered (e.g., images with higher relevance scores may be put towards the front of the set).

Figure 10:
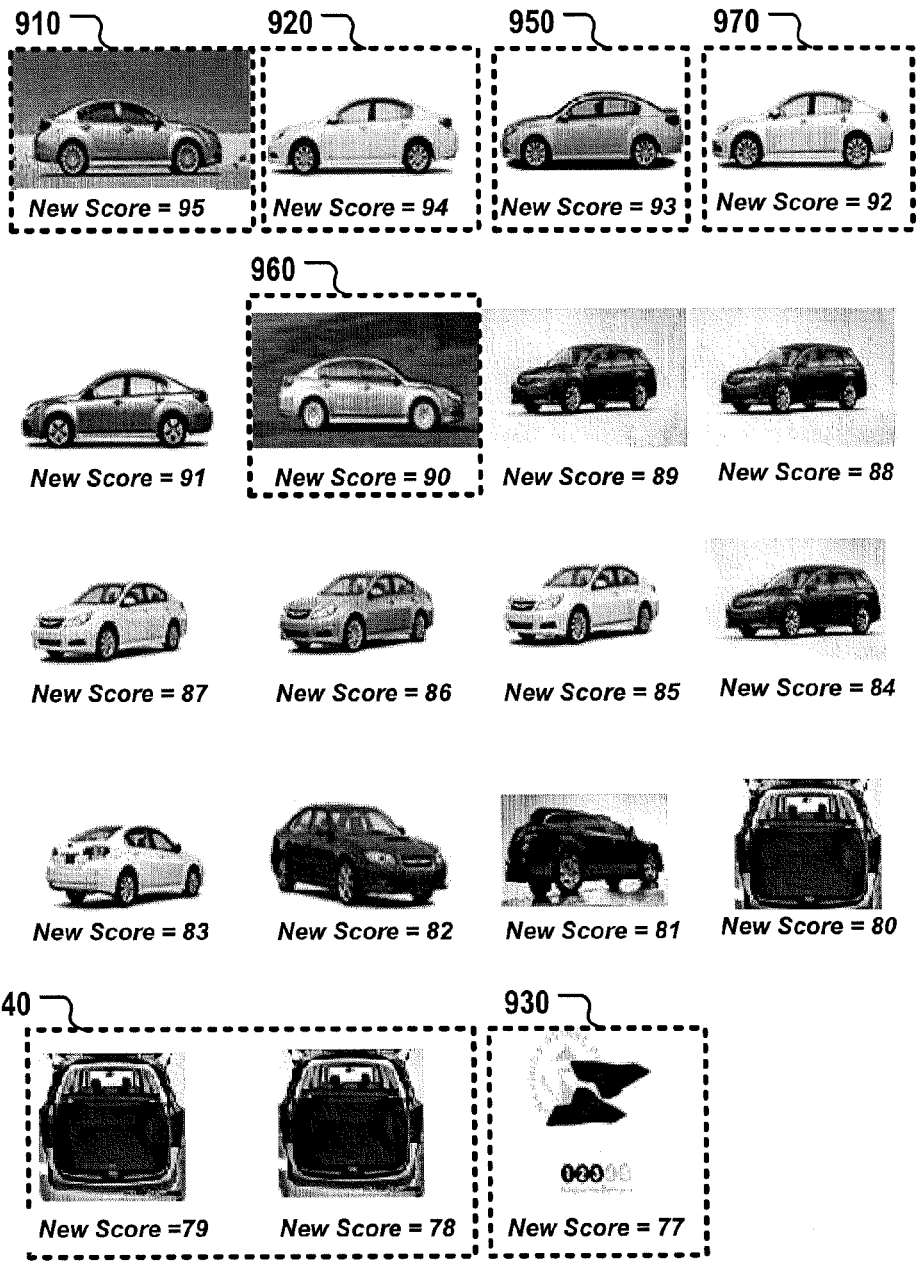
FIG. 10 depicts a re-ranked version of the first set of images that is produced using the second image search engine of FIG. 3.

Returning to FIG. 4, at task 440, new relevance scores are assigned to one or more images in the second set of images (e.g., image set 900) in order to eliminate the impact of inaccurate relevance scores such as the ones discussed above. The new relevance scores may be assigned by using the image classifier trained at task 430. In this example, the new relevance scores assigned to the images in the first set are depicted in FIG. 10.

At task 445, images from the first set are presented to a user based on the new relevance scores. The presentation may involve displaying the images on a display device, such as an LCD monitor, or alternatively the presentation may involve transmitting the images over a communications network to a client device, such as the client device 150. In one aspect, the presented images may be sorted based on the relevance scores (e.g., images with the highest scores may be presented closer to the top of a display page or graphics pane of the GUI 210). In another aspect, only images having a relevance score greater than a predetermined threshold may be presented. Alternatively, in yet another aspect, only images having a relevance score located within a predetermined range of score values may be presented.

Figure 5:
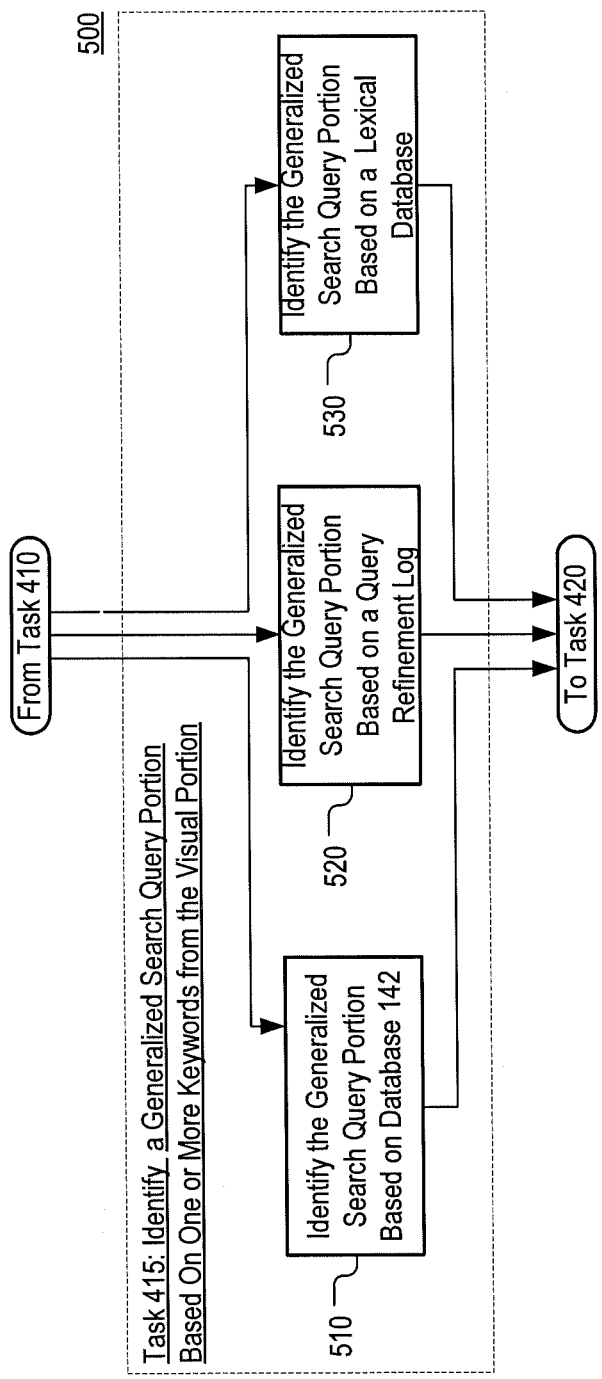
FIG. 5 depicts a flowchart of a process related to the process of FIG. 4.

FIG. 5 depicts a flowchart of a process 500 for identifying a generalized search query portion as specified by task 415 of FIG. 4. In this example, the generalized search query portion may be determined by using the database 142, a query refinement log, or a lexical database. Each one of these approaches is discussed with respect to tasks 510-530, respectively. It should be noted that the generalized search query portion may be determined by executing just one of the tasks 510-530.

At task 510, the generalized search query portion is determined by consulting the database 142 that relates keywords to categories associated with the keywords. In this instance, the generalized search query portion is a category related to one or more keywords from the semantic portion of the first search query. At task 520, the generalized search query portion is determined based on query refinement logs. Query refinement logs may be records that identify different sets of queries. The queries in each set are queries having scopes that differ and overlap at the same time. For example, a user may start an Internet search with a query "vehicles." In none of the search results returned in response to the query satisfy the user, the user may enter another query "4×4 vehicles." After inspecting the queries, the user may enter the third query "Subaru." In other words, ordinarily, when a user searches for information, the user may reformulate an original search query ("Vehicle") several times in order to find the information which the user is looking for. The original query ("Vehicle") and its reformulations ("4×4 vehicle" and "Subaru") are one example of a set of search queries that may be found in a query refinement log. As illustrated, some queries in the set are generalizations of other queries in the same set.

In this example, the generalized version of the semantic portion of the first search query may be a search query (or portion thereof) from a refinement log that bears predetermined statistical relationship to one or more keywords of the semantic portion of the first search query. For example, if the query "car" is found in most query sets that include the query "Subaru," but the query "Subaru" is not found in most query sets that include the query "car", this might be an indication that the query "car" is a generalization of the query "Subaru". In some aspects, the query refinement logs may be determined based on empirical observations of user behavior or, alternatively, they may be derived analytically. The disclosure is not limited to any specific type of query refinement logs.

At task 530, the generalized search query portion is determined by consulting a lexical database. As with task 510, the generalized search query portion may be a category associated with one or more keywords from the semantic portion of the first search query. The category may be determined based on a genus-species relationship specified by a lexical database, such as WordNet. WordNet is a large lexical database of the English language that is provided by Princeton University. In WordNet, words are grouped into sets of cognitive synonyms, wherein each set expresses a different concept. The sets are linked according to conceptual-semantic and lexical relations allowing meaningfully related words and concepts to be identified. Thus, by using WordNet, the second search engine 134 may identify a category corresponding to the semantic portion of the search query. For example, the second search engine 134 may use the WordNet to determine that "Subaru Legacy" is a type of "vehicle." WordNet may be different from the database 142 in that WordNet is limited to the taxonomy contained in the English language, whereas the database 142 may identify category-species relationships that are contrived by administrators or other users and are custom in their nature. Also, WordNet may include a larger number of entries than the database 142.

Figure 6:
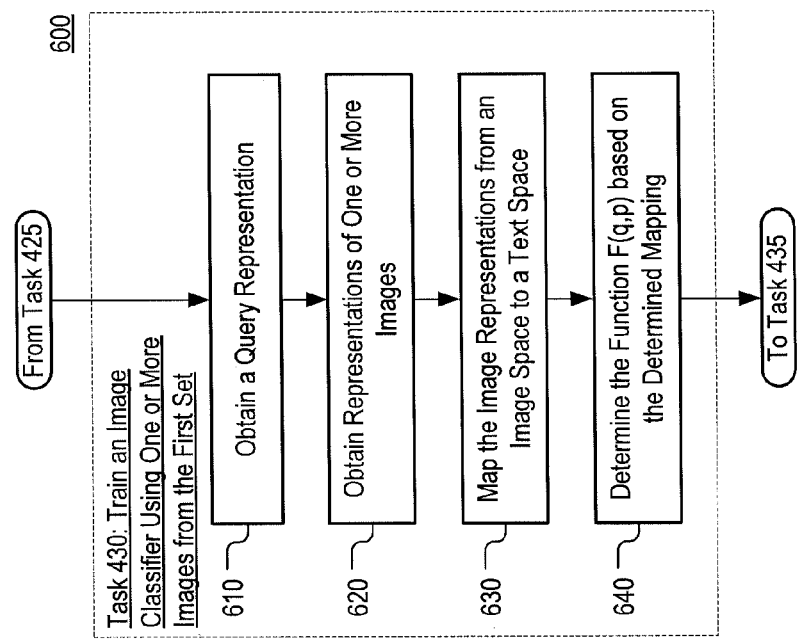
FIG. 6 depicts a flowchart of a process related to the process of FIG. 4.

FIG. 6 depicts a flowchart of a process 500 associated with the training of an image classifier as specified by task 430 of FIG. 4. At task 610, a representation $q_2$ of the second query is obtained. Obtaining the representation involves mapping the text of the second query to a vector in the text space T. In this example, the representation $q_2$ of the second search query may be a vocabulary sized vector in which the $i^{th}$ component is a weight related to the presence or absence of the term i in the search query. At task 620, representations for one or more images in the second set of images are obtained. The representation for each image p may be a projection of that image from the image space (e.g., the space defined by values of at least some of the pixels of the image) into another space P (e.g., feature space) that is different from the image space. The image representation may be a bag of visterms, histogram of color and/or texture, GIST features or any other type of image representation used in image recognition.

At task 630, a function $f_w$ is determined for mapping each of the image representations determined at task 620 from the space P to the space T. The mapping function may have the format $f_w(p)=(w_1 p, \ldots, w_n p)$, where $w=(w_1, \ldots, w_n) \in \text{of } P^T$. The function $F_w$ may be determined by identifying the values of w that minimize a loss function $L(F;D_{train})$. The parameter $D_{train}$ is training data and it may be based on the image representations determined at task 620. Further information about the loss function L and the training of image classifiers implementing PAMIR is provided in Grangier et al., Learning to Retrieve Images from Text Queries with a Discriminative Model, International Conference on Adaptive Media Research (2006), which is herein incorporated by reference.

At task 640, the value of a function F(q,p) that is implemented by the image classifier is determined. Specifically, a function $F^{text}$ may be obtained that is used to determine the relevance of documents, such as web pages, to text search queries. The function $F^{text}$ may be a function that is customarily used in performing text-based document searches. The function $F^{text}$ may have the format $F^{text}(q,d)$, wherein the q is a representation of a text search query, and d is a representation of a document, such that both q and d belong to the space T. Once the function $F^{text}$ is obtained, the function F(q,p) may be derived by substituting the parameter d, in the function $F^{text}$ with the function $f_w(p)$ that is determined at task 630.

Figure 7:
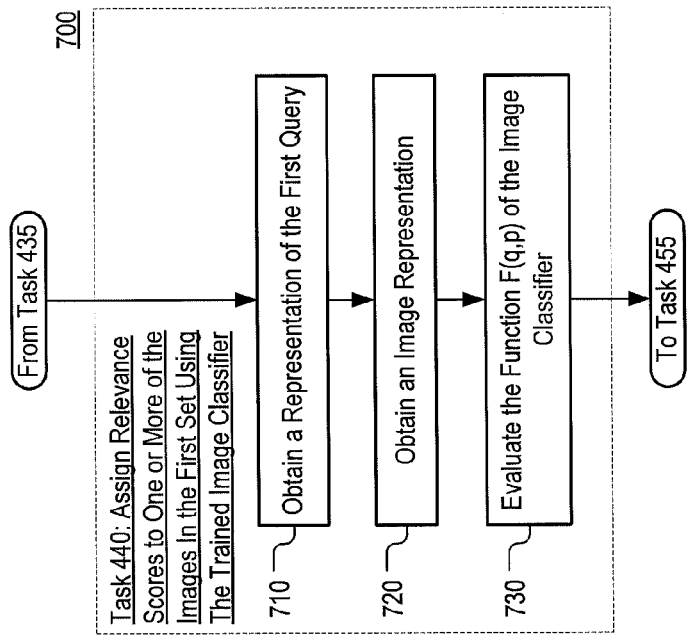
FIG. 7 depicts a flowchart of a process related to the process of FIG. 4.

FIG. 7 depicts a flowchart of a process 700 associated with assigning a new relevance score to an image from the second set of images that is obtained at task 445. At task 710, a representation $q_1$ of the first query is obtained. The representation may be a vector in the text space T and it may be obtained in the manner discussed with respect to task 610. At task 720, a representation $p_1$ of an image from the second set of images is obtained. In this example, the image may be represented using a bag-of-visterms representation, but, as noted with respect to task 320, the disclosure is not limited to using this type of image representation only. At task 730, the function F(q,p) determined at task 640 is evaluated for $q=q_1$ and $p=p_1$. As discussed above, the value of the function F may constitute the new relevance scores.

Figure 11:
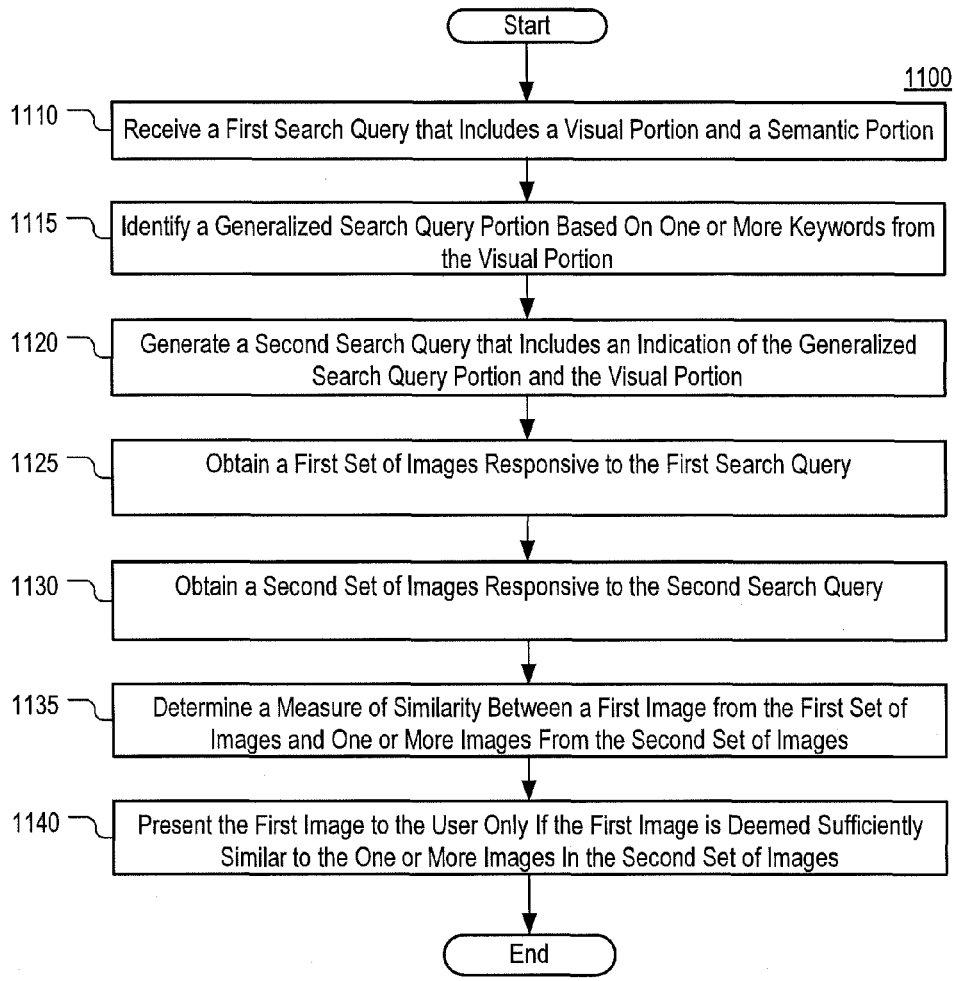
FIG. 11 depicts a flowchart of another process in accordance with aspects of the disclosure.

FIG. 11 depicts a schematic diagram of a process 1100 for performing an improved image search in accordance with other aspects of the disclosure. At task 1110, a first image search query is received that includes a semantic portion and a visual portion. In this example, the first search query may be "Subaru Legacy side view." At task 1115, the semantic portion of the search query is processed to identify a generalized search query portion that is associated with one or more keywords that make up the semantic portion. Task 1115 is identical to task 415. At task 1120, a second search query is prepared that includes an indication of the determined generalized search query portion and the visual portion of the first search query. In this example, the second search query may be "car side view." At task 1125, a first image search is performed using the first search query and a first set of images is obtained in response. The first image search may be performed by using an image search engine, such as the first search engine 132. The first set of images may be obtained from the search engine performing the first image search. The first set of images may include images that are found by the search engine to match the first search query. At task 1130 a second image search is performed using the second search query (car side view) and a second set of images is obtained in response to the search. The second image search may be performed by using any known image search engine, such as the first image search engine 132. The second set of images may be obtained from the search engine performing the second image search. The second set of images may include images that are found by the search engine to match the second search query.

At task 1135 a measure of similarity is determined between a first image from the first set of images and one or more images from the second set of images. The measure of similarity may be a number, or an alphanumerical string, that is indicative of whether the first image is visually similar to the one or more images (e.g., whether the first image depicts the same objects as the one or more images). The measure of similarity may be obtained by using any known computer vision technique for comparing images. Task 1135 is further discussed with respect to FIG. 10.

At task 1140, the first image is presented to a user. The presentation may involve displaying the first image on a display device, such as an LCD monitor, or alternatively the presentation may involve transmitting the first image over a communications network to a client device, such as the client device 150. In some aspects, the first image may be output only if it is found to be sufficiently similar to the one or more images from the second set. The first image may be considered sufficiently similar when the measure of similarity determined at task 1135 is located within a predetermined range of possible similarity measure values. For example, the first image may be considered sufficiently similar if the measure of similarity exceeds a predetermined threshold. In another aspect, the measure of similarity may affect the order in which the first image is presented. For example, the first image may be presented in a search results page, such as the graphics pane 240, behind images having higher measures of similarity to the one or more images from the second set.

Figure 12:
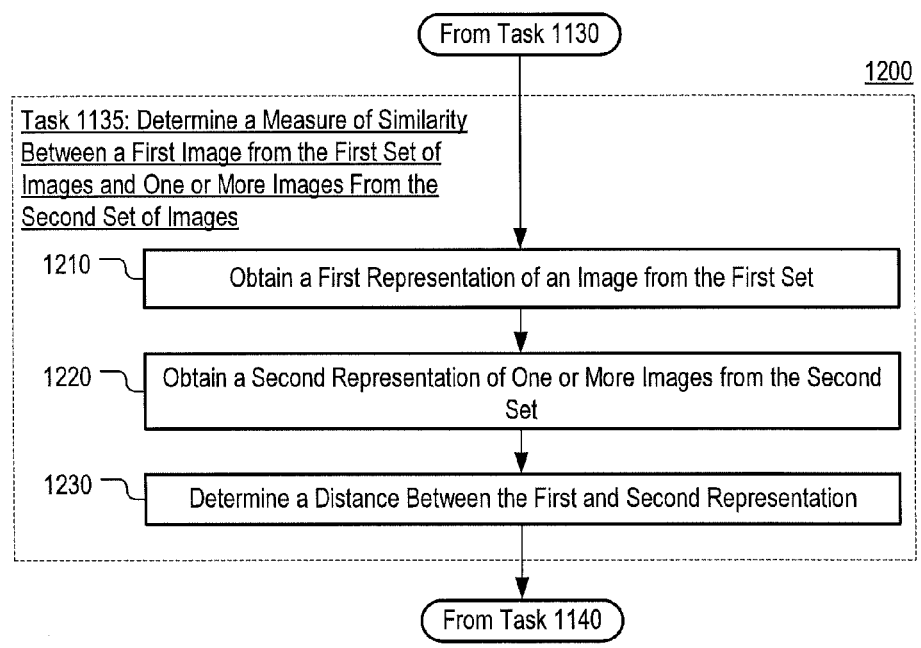
FIG. 12 depicts a flowchart of a similarity process related to the process of FIG. 11.

FIG. 12 depicts a flowchart of a process 1200 associated with determining whether a first image from the first set of images is similar to one or more images from the second set of images as specified by task 1135 of FIG. 11. At task 1210, a representation of the first image is generated. Task 1210 is identical to task 420. At task 1220, a representation of one or more images from the second set is determined.

In instances where the representation of only one image is determined, that representation may be generated in the same manner as the representation of the first image at task 1210. In instances where the representation of multiple images is determined, those representations may be determined by using any known technique, such as obtaining representation of individual images from the second plurality of images and averaging the obtained representations. At task 1230, a measure of similarity between the representation of the first image and the representation of one or more images from the second set is determined. In one aspect, the measure of similarity between the representation of the first image and the representation of the second image may be a number (or another identifier) that is based on the distance between the two representations. The distances between the two representations may be determined by using any known kernel function for comparing a representation of an image to a template for one or more other images.

Figure 13:
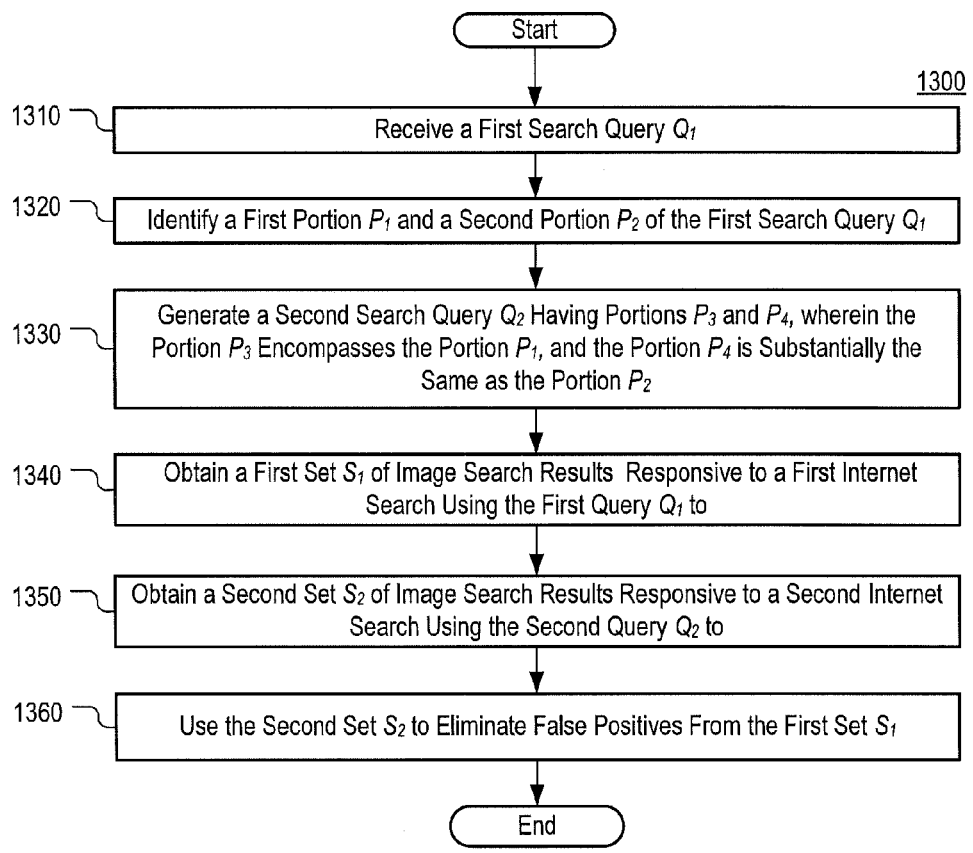
FIG. 13 depicts a flowchart of a process in accordance with yet another aspect of the disclosure.

FIG. 13 depicts a flowchart of a process 1300 for performing an improved image search in accordance with yet other aspects of the disclosure. At task 1310, a first search query $Q_1$ is received. The search query may be received over a communications network from a client device, such as the client device 150. Alternatively, the first search query may be received from an input device, such as a keyboard. In this example, the first search query $Q_1$ may be "Subaru Legacy side view."

At task 1320 a first portion $P_1$ and a second portion $P_2$ of the search query are identified. The portion $P_1$ may be a semantic portion, visual portion, or any other type of portion. Similarly, the portion $P_2$ may be a semantic portion, visual portion, or any other type of portion. The portion $P_1$ may or may not be independent of the portion $P_2$. In some aspects, the portions $P_1$ and $P_2$ may be specified by the user via separate text input fields as illustrated in FIG. 3. Alternatively, the portion $P_1$ and the portion $P_2$ may be identified by processing the first search query $Q_1$. For example, each noun (or name of an object sought to be depicted in the search results corresponding to the search query $Q_1$) may be part of a separate portion. Moreover, each of the identified portions may include any adjectives used in the search query to modify a noun that is part of that portion. Nouns and adjectives may be recognized by maintaining predetermined lists of words that are known to be nouns or adjectives. In this example, the portion P1 may be "Subaru Legacy" and the portion $P_2$ may be "side view."

At task 1330 a second search query $Q_2$ having a first portion $P_3$ and a second portion $P_4$ is generated. The portion $P_3$ may be generated such that it is broader than the portion $P_1$. For example, the first portion $P_3$ may include an indication of a category that corresponds to a keyword found in the portion $P_1$. The criterion "car" can be satisfied by all images depicting a car, regardless of make, whereas the criterion "Subaru Legacy" can be satisfied by only images depicting a Subaru Legacy and thus the portion $P_3$ (car) is said to be broader in scope than the portion $P_1$ (Subaru Legacy). At the same time, the portion $P_3$ may encompass the portion $P_1$. That is, the criterion specified by the portion $P_3$ (car) may be met by all images that satisfy the portion $P_1$ (Subaru Legacy). Put differently, the portion $P_3$ may be specified such that the set of possible search results $R_1$ that satisfy the portion $P_1$ is a proper subset of the set of search results $R_2$ that satisfy the portion $P_3$. By way of example only, the portion $P_3$ may be determined in the manner discussed with respect to task 415 of FIG. 4.

Regarding the portion $P_4$, in one aspect, the portion $P_4$ may be the same as the portion $P_2$. In another aspect, the portion $P_4$ may be different from the portion $P_2$, but rather have a similar scope. Put differently, the portion $P_3$ may be specified in a manner such that the set of possible search results $R_1$ that satisfy the portion $P_2$ is substantially the same as the set of search results $R_2$ that satisfy the portion $P_2$. An example of possible search query portions that have the same scope may be "color red" and "color having a wavelength of about 650 nm." Another example of possible search query portions that have the same scope may be "car" and "automobile." Thus, in some instances, the portion $P_4$ may be a paraphrased version of the portion $P_2$. Furthermore, in yet other instances, the portion $P_4$ may be completely omitted thus causing the query $Q_2$ to include only the portion $P_3$. In this example, the second search query may be "car side view", with "car" being the portion $P_3$ and "side view" being the portion $P_4$.

At task 1340, a first image search is performed for the first query $Q_1$ and a first set of images $S_1$ is obtained as a result of the first image search. In this example, the first set $S_1$ may be the set 900 depicted in FIG. 9. At task 1350, a second image search is performed and a second set of images $S_2$ is obtained as a result of the second image search. In this example, the second set $S_2$ may be the set 800 depicted in FIG. 8. Tasks 1340 and 1350 may be performed in the same manner as tasks 430 and 425.

At task 1360, the second set of images $S_2$ is used to eliminate false positives from the first set of images $S_1$. As discussed above, false positives may be images that do not satisfy the first search query, such as the image 930 discussed with respect to FIG. 9. In one aspect, false positives may be eliminated by determining a measure of similarity between each image from the set $S_1$ and one or more images from the set $S_2$. If the measure of similarity for an image from the set $S_1$ exceeds a predetermined threshold (or is within a predetermined range of similarity measure values), the image may presented for viewing to the user who submitted the first search query $Q_1$. In this aspect, the determination of the measure of similarity may be performed in the manner discussed with respect to FIG. 11.

In another aspect, false positives may be eliminated by training a function that maps images to a score. The function may be trained based on images from the second set $S_2$ and it may be used to assign a ranking score to one or more images from the first set $S_1$. The score may be any score produced by the function and it need not be a measure of visual similarity between the image from the first set and one or more images from the second set. Similarly, the ranking score need not indicate relevance with respect to a search query. By way of example only, the trained function may be a Mahalanobis distance-based ranker that determines the score based on the Mahalanobis distance between an image $I_1$ from the first set $S_1$ and, a first centroid of the first set $S_1$ of mages and/or a second centroid of the second set $S_2$ of images. If the score falls within a predetermined range (e.g., exceeds a threshold), the image $I_1$ from the first set $S_1$ may be presented for viewing to the user who submitted the search query $Q_1$.

In a yet another aspect, false positives may be eliminated by training an image classifier and using it to assign a new relevance score to one or more images from first set of images $S_1$. In some aspects, the image classifier may be trained using the images from the set $S_2$. Afterwards, the trained image classifier may be used to assign a relevance score to an image from the $S_1$ with respect to the first search query $Q_1$. The training of the classifier and the assignment of new relevance scores may be performed in the manner discussed with respect to FIG. 4. Once the new relevance scores are assigned, they may be used in presenting the images to the user. In one aspect, the presented images may be sorted based on the relevance scores (e.g., images with the highest scores may be presented closer to the top of a display page or graphics pane of the GUI 210). In another aspect, only images having a relevance score greater than a predetermined threshold may be presented for viewing by a user. Alternatively, in yet another aspect, only images having a relevance score located within a predetermined range of score values may be presented.

In yet another aspect, as discussed with respect to FIG. 11, the measure of similarity, or ranking score, that is assigned at task 1360 to one or more images from the set $S_1$ may affect the order in which the image is presented relative to other images that are displayed on the same search results page. For example an image from the second set that is found to be more similar to image(s) from the first set may be presented closer to top of a search results page than another image from the second set that is found less similar (e.g., another image that is assigned a lower similarity score). In the same manner, images having higher ranking scores may be presented further towards the top of a search results page than images having lower ranking scores. It should be noted that the relative positions of images on the search result page is only one way in which images that have higher similarity/ranking scores may be highlighted to the user when search results are presented. For instance, the search results page may include another type of indication (e.g., a number, a set of stars) that could inform the user how a given image from the second set compares to image(s) from the second set.

It should be noted that, FIGS. 4-7 and 11-13 are provided as examples. In some aspects, at least some of the tasks associated with FIGS. 4-7 and 11-13 may be performed in a different order than represented, performed concurrently, or altogether omitted. Each of the processes 400, 1100, and 1300 may be executed by the computing device 101 individually or by both the client device 150 and the computing device 101. In that regard, the GUI 210 may be executed on either the computing device 101 or the client device 150. In the latter instance, the GUI 210 may interface with the second image search engine 134. Although, in this example, separate text input fields are provided for the semantic and visual portions of the search query, in other examples a single text input field may be provided where the two portions are inserted together as a single string. In such examples, the visual and semantic portions of the search query may be parsed apart by the image search engine by using natural language processing or other similar techniques. Furthermore, the semantic and visual portions may be received as separate search queries.

It should further be noted that the disclosure is not limited to any specific image processing technique for determining whether an image from one set of images is similar to one or more images from a second set of images, as discussed with respect to tasks 1135 and 1370. Similarly, although in the above examples an image classifier that uses PAMIR is discussed, it should be noted that the disclosure is not limited to any specific type of image classifier technology. In addition, it should be noted that the processes 400, 1100, and 1300 may be executed at least partially by the second image search engine 134. The second image search engine 134 may be implemented in software, in hardware (e.g., by programming an FPGA to perform the processes) in both hardware and software.

Most of the foregoing examples are not mutually exclusive, but may be implemented in various combinations to achieve unique advantages. As these and other variations and combinations of the features discussed above can be utilized without departing from the subject matter as defined by the claims, the foregoing description should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples.

The invention claimed is:

1. A computer-implemented method comprising:
   receiving an initial search query that includes (i) one or more query terms associated with an object, and (ii) one or more query terms that identify a context in which the object is to appear in images that are identified in response to the initial search query;
   determining a category associated with the object;
   generating a generalized search query that includes (i) one or more query terms associated with the category, and (ii) one or query terms that identify the context in which the object is to appear in images that are identified in response to the initial search query;
   obtaining (i) an initial set of one or more images that are identified as responsive to the initial search query, and (ii) a generalized set of one or more images that are identified as responsive to the generalized search query; and
   selecting one or more of the images of the initial set based at least on an indication of similarity between the selected one or more images and the one or more images of the generalized set of one or more images.

2. The method of claim 1, wherein the context comprises a viewpoint.

3. The method of claim 1, wherein determining a category associated with the object comprises identifying categories associated with the one or more query terms associated with the object in the initial search query.

4. The method of claim 1, comprising generating the indication of similarity based on:
determining a function based on the generalized set of one or more images and the first query; and
determining to generate the indication of similarity based on evaluating the function using the selected one or more images.

5. The method of claim 1, comprising generating the indication of similarity based on:
training an image classifier using the one or more images of the generalized set of one or more images; and
determining to generate the indication of similarity based on classifying the selected one or more images using the trained image classifier.

6. The method of claim 1, comprising generating the indication of similarity based on:
generating first representations of the selected one or more images;
generating a second representation based on the generalized set of one or more images;
identifying differences between the first representations and the second representation; and
determining to generate the indication of similarity based on the identified differences.

7. The method of claim 1, comprising:
identifying, in the initial search query, the one or more query terms associated with the object; and
identifying, in the initial search query, the one or more query terms that identify the context in which the object is to appear in images that are identified in response to the initial search query.

8. A system comprising:
one or more computers and one or more storage devices storing instructions that are operable, when executed by the one or more computers, to cause the one or more computers to perform operations comprising:
receiving an initial search query that includes (i) one or more query terms associated with an object, and (ii) one or more query terms that identify a context in which the object is to appear in images that are identified in response to the initial search query;
determining a category associated with the object;
generating a generalized search query that includes (i) one or more query terms associated with the category, and (ii) one or query terms that identify the context in which the object is to appear in images that are identified in response to the initial search query;
obtaining (i) an initial set of one or more images that are identified as responsive to the initial search query, and (ii) a generalized set of one or more images that are identified as responsive to the generalized search query; and
selecting one or more of the images of the initial set based at least on an indication of similarity between the selected one or more images and the one or more images of the generalized set of one or more images.

9. The system of claim 8, wherein the context comprises a viewpoint.

10. The system of claim 8, wherein determining a category associated with the object comprises identifying categories associated with the one or more query terms associated with the object in the initial search query.

11. The system of claim 8, the operations comprising generating the indication of similarity based on:
determining a function based on the generalized set of one or more images and the first query; and
determining to generate the indication of similarity based on evaluating the function using the selected one or more images.

12. The system of claim 8, the operations comprising generating the indication of similarity based on:
training an image classifier using the one or more images of the generalized set of one or more images; and
determining to generate the indication of similarity based on classifying the selected one or more images using the trained image classifier.

13. The system of claim 8, the operations comprising generating the indication of similarity based on:
generating first representations of the selected one or more images;
generating a second representation based on the generalized set of one or more images;
identifying differences between the first representations and the second representation; and
determining to generate the indication of similarity based on the identified differences.

14. The system of claim 8, the operations comprising:
identifying, in the initial search query, the one or more query terms associated with the object; and
identifying, in the initial search query, the one or more query terms that identify the context in which the object is to appear in images that are identified in response to the initial search query.

15. A non-transitory computer-readable medium storing software comprising instructions executable by one or more computers which, upon such execution, cause the one or more computers to perform operations comprising:
receiving an initial search query that includes (i) one or more query terms associated with an object, and (ii) one or more query terms that identify a context in which the object is to appear in images that are identified in response to the initial search query;
determining a category associated with the object;
generating a generalized search query that includes (i) one or more query terms associated with the category, and (ii) one or query terms that identify the context in which the object is to appear in images that are identified in response to the initial search query;
obtaining (i) an initial set of one or more images that are identified as responsive to the initial search query, and (ii) a generalized set of one or more images that are identified as responsive to the generalized search query; and
selecting one or more of the images of the initial set based at least on an indication of similarity between the selected one or more images and the one or more images of the generalized set of one or more images.

16. The medium of claim 15, wherein the context comprises a viewpoint.

17. The medium of claim 15, wherein determining a category associated with the object comprises identifying categories associated with the one or more query terms associated with the object in the initial search query.

18. The medium of claim 15, the operations comprising generating the indication of similarity based on:

determining a function based on the generalized set of one or more images and the first query; and determining to generate the indication of similarity based on evaluating the function using the selected one or more images.

19. The medium of claim 15, the operations comprising generating the indication of similarity based on:

training an image classifier using the one or more images of the generalized set of one or more images; and determining to generate the indication of similarity based on classifying the selected one or more images using the trained image classifier.

20. The medium of claim 15, the operations comprising generating the indication of similarity based on:

generating first representations of the selected one or more images;

generating a second representation based on the generalized set of one or more images;

identifying differences between the first representations and the second representation; and determining to generate the indication of similarity based on the identified differences.

\* \* \* \* \*